United States Patent Office 3,784,657
Patented Jan. 8, 1974

3,784,657
TIME MONITORED PROCESS FOR CONTROLLING INJECTION MOLDING CYCLE
Herman R. Hutchinson, Wyncote, Vasken F. Arpajian, Huntingdon Valley, and Robert S. Malcomson, Lansdale, Pa., assignors to Pennwalt Corporation, Philadelphia, Pa.
Division of application Ser. No. 59,499, July 30, 1970, now Patent No. 3,695,800, dated Oct. 3, 1972. Continuation-in-part of application Ser. No. 18,142, Mar. 10, 1970, now Patent No. 3,642,402, dated Feb. 15, 1972. Divided and this application May 24, 1972, Ser. No. 256,607
Int. Cl. B29f 1/08
U.S. Cl. 264—40
4 Claims

ABSTRACT OF THE DISCLOSURE

Process control for injection molding machines in which the viscosity of the plasticized material in a shot being prepared is monitored as a function of ram injection speed (rate of melt flow) at constant hydraulic pressure. The interval is measured during ram advancement between the time at which a pressure relief valve opens and the time that the mold cavities are substantially filled (when the ram is at end of stroke). If the time period exceeds or falls below predetermined limits, either (1) the heat input to subsequent shots being prepared may be respectively raised or lowered in increments, (2) high pressure injection time may be respectively added or subtracted in increments to increase or decrease the point in time at which lower secondary hydraulic pressure is applied, or (3) injection pressure may be respectively raised or lowered.

---

This is a division of application Ser. No. 59,499, filed July 30, 1970, now Pat. No. 3,695,800, granted Oct. 3, 1972.

This invention relates to injection molding machines, and more particularly relates to a method and for controlling the operation of such injection molding machines in order to produce consistently uniform parts, especially when dimensions or cycle conditions are critical.

This application is a continuation-in-part of our prior U.S. patent application, Ser. No. 18,142, filed Mar. 10, 1970, now Pat. No. 3,642,402, granted Feb. 15, 1972.

The aforesaid prior application described and showed a process control system for injection molding in which the viscosity characteristics of the plasticized material in the shot being injected were monitored as a function of the pressure in the melt stream at a predetermined position of the ram forward stroke during material flow into the mold. If the measured pressure exceeded or fell below previously determined band limits set for producing quality molded parts, the heat input to subsequent shots being prepared was respectively raised or lowered by (1) increasing or decreasing barrel temperature, (2) increasing or decreasing speed of screw rotation, or (3) increasing or decreasing back pressure on the screw during rotation thereof. This "control" pressure was monitored at any portion of the melt stream from a zone in the extrusion barrel in advance of the screw to a point within the mold cavity itself. The "control" pressure measurement was taken at the same point in time during each cycle somewhere between 50% and 80% cavity fill when the injection ram was advancing at substantially constant speed. However, there are certain injection cycles where hydraulic pump volume is so great and the cavity gates so small that almost no portion of the injection stroke is accomplished at constant speed. In addition, the use of a precision high pressure sensing and control device, such as a pressure transducer, adds appreciable cost to the injection molding equipment.

It is therefore an object of this invention to provide a method for the process control of an injection molding cycle in which the viscosity index of the plasticized material in the shot being prepared is monitored as a function of the ram injection speed based upon rate of melt flow.

Another object of this invention is to provide a process for an injection molding apparatus which monitors the speed of the ram at constant pressure as a barometer of the viscosity of the shot being injected.

Still another object of this invention is to provide a time based process for injection molding machines in which automatic compensation is accomplished for batch-to-batch variations in molding material, variations in percentage regrind in the feed, variations in mold temperatures, and variations in ambient temperature and humidity conditions.

Yet another object of this invention is to provide a time-based monitoring system for injection molding machines in which viscosity of the melt is measured as a function of rate of flow, and when the flow rate exceeds or falls below predetermined limits compensation may be effected either by (1) respectively decreasing or increasing the heat input to the subsequent shots being prepared, (2) respectively decreasing or increasing injection time, or (3) decreasing or increasing injection pressure.

Yet still another object of this invention is to provide an injection molding process for very high speed operations in which part quality is achieved without changing viscosity.

A further object of this invention is to provide a process for injection molding machines in which the viscosity index is monitored as a function of injection speed and when the speed falls outside prescribed limits compensating for such variation by appropriately changing heat input to the next shot being prepared, changing the injection period, or changing the injection pressure.

Other objects are to provide an improved method of the character described which is easily and economically accomplished and which is highly efficient and effective in operation.

With the above and related objects in view, this invention consists of the details of construction and combination of parts as will be more fully understood from the following detailed description when read in conjunction with the accompanying drawings in which:

FIG. 2 is an electrical schematic diagram of the solid state control circuit embodying this invention, FIG. 2A illustrating the control switches, sample counter and "inhibit" circuitry, FIG. 2B illustrating the "add count" circuitry, and FIG. 2C illustrating the "remove count" circuitry.

FIG. 3 is an electrical schematic diagram of the temperature control circuitry.

Referring now in greater detail to the drawings in which similar reference characters refer to similar parts, we show an injection molding process control system in which the viscosity characteristics of the plasticized material in the melt stream is monitored as a function of shot injection time by measuring the rate of melt flow into the mold cavities at constant pressure. During the forward portion of the injection stroke, the hydraulic pressure behind the ram builds up to a predetermined level which is sufficiently high as to insure high speed injection and thereafter a relief valve in the hydraulic system opens during the last 10 to 20 percent of cavity fill. Once the relief valve opens, the rate of flow into the mold becomes pressure limited so that the speed of the ram gradually slows down until the end of the injection stroke. By measuring the elapsed time from the point of opening of the relief valve to the end of the injection stroke, an index of the melt viscosity may be obtained since a larger interval of time to fill would be an indicia of a more viscous melt characteristic while a shorter interval would indicate a less viscous condition. Variations from prescribed monitored norms are then compensated in subsequent shots by (1) adjusting the heat input to the extrusion barrel, for example through appropriate temperature controls, through changes in extrusion speed or varying back pressure on the extrusion screw, (2) appropriately increasing or decreasing the duration of the injection stroke, or (3) increasing the hydraulic injection pressure, until the desired time band is again reestablished.

Figure 1:
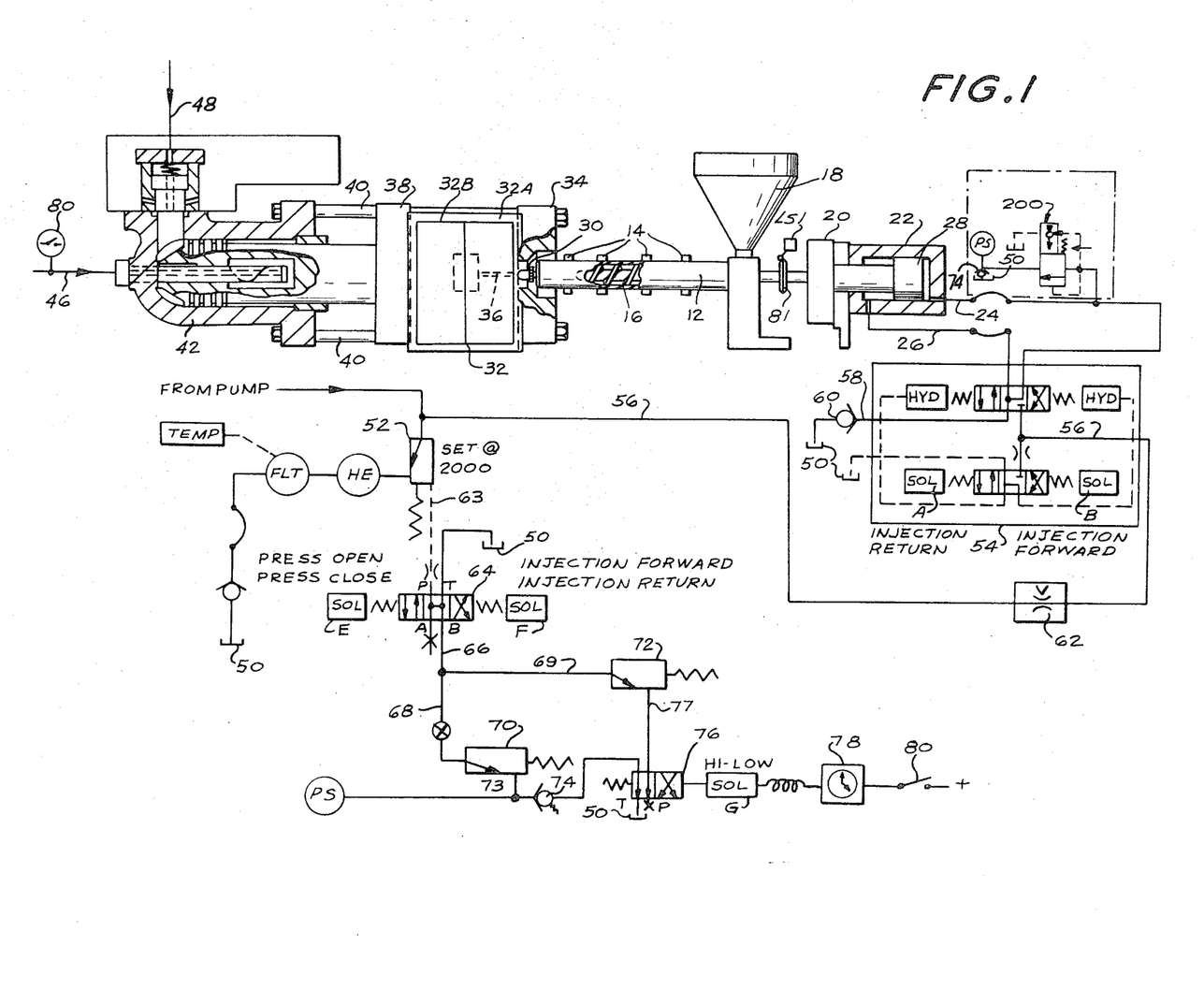
FIG. 1 is a side elevational view, and partly in section, of an injection molding machine embodying this process control invention and including the hydraulic circuitry incident to the process control.

Referring now to FIG. 1, the injection molding apparatus itself is generally conventional and includes an extrusion cylinder or barrel 12 which is heated by a number of electrical elements 14. A screw 16 axially supported in the barrel 12 is both rotatable and longitudinally reciprocable therein. Plastic material is fed into the barrel 12 from a hopper 18. Rotary motion for the screw 16 acts to plasticize the material and is accomplished by means of a suitable motor drive unit 20. A hydraulic cylinder 22 connected to oil lines 24 and 26 operates to drive piston 28 in either forward or reverse directions for injection of the prepared shot through nozzle 30 into the mold 32. As illustrated, the right-hand portion 32A of the mold is mounted upon a stationary platen 34 and includes a sprue 36 which channels the plastic from the nozzle orifice into the mold cavity. The left-hand portion 32B of the mold is affixed to a moving platen 38 which is horizontally reciprocable on tie rods 40. Opening and closing of the mold is effected by way of clamping cylinder 42 operative by way of suitable oil lines 44 and 46 connected to the hydraulic pumping system.

The hydraulic system for controlling the piston 28 operative within cylinder 22 (and clamping cylinder 42 as well) includes a motor driven pump (not shown) whose intake side is connected to a tank or reservoir 50 and a pressure regulating valve 52 associated therewith for maintaining a predetermined pressure in lines 24 and 26. A conventional 4-way hydraulic reversing valve 54 is interposed to direct fluid under pressure from line 56 through either line 24 or line 26 to actuate the injection piston 28 in the desired direction and to return the fluid displaced by movement of the piston through the other of the lines, through the valve 56 itself and back to the tank 50 via line 58 and check valve 60. A suitable volume control valve 62 is incorporated in line 56 for adjusting the rate of oil flow. The directional disposition of the "forward-return" four-way control valve 54 is controlled by push buttons (not shown) on the control panel and actuate solenoid A or solenoid B within the valve itself.

The pressure control valve 52 is nominally set at 2000 p.s.i., for example, and a small portion of the hydraulic flow is permitted to pass and bleed through control line 63 with 4-way valve 64 in either "neutral" or in "left" position. With the 4-way injection control valve 54 in "forward" position, solenoid F moves the position of the valve 64 to the left so that control line 63 is in communication with line 66. Line 66 branches to a primary remote control line 68 and to a secondary pressure remote control line 69, both of which lead to the control or instrument panel (not shown). The primary control line 68 directs control fluid in line 69 is directed to a secondary remote pressure relief valve 70 which is also mounted on the instrument panel and nominally adjustably set to a lower pressure, for example 1200 p.s.i. The drain from primary injection pressure control valve 70 is directed back to the sump 50 by way of drain line 73, check valve 74 and Hi-Low valve 76, when the latter is in the position shown. A pressure actuated switch PS is adapted to trigger an electrical signal when a predetermined control pressure has been attained. This starts the monitored time interval when constant injection pressure begins. Correspondingly, the drain from secondary injection pressure remote control valve 72 is directed through line 77 which is normally blocked by valve 76 until Hi-Low solenoid G is actuated. Solenoid G is energized after a predetermined set time has run on Hi-Lo timer 78 which is itself triggered by closure of a switch 80 at the start of the injection stroke. In the present embodiment, switch 80 is a pressure actuated switch located in the press hydraulic clamping circuit and adapted to be closed when full hydraulic pressure has been applied to the clamping cylinder 42. The main relief valve 52 is thus controlled to lower values by remote relief valves 70 and 72.

The time interval monitored by the instant invention beings at a precise moment in time during the forward injection stroke of the piston 28 and ram 16 when the control hydraulic pressure reaches a predetermined value. This value is determined by the control pressure which is set on the primary remote control relief valve 70 for the particular plastic material being run, and the trigger for the start of the time period occurs when the pressure switch PS is tripped to produce an electrical signal. The end of the time period is determined when the ram 16 has substantially filled the mold cavities and when limit switch LS1 has been tripped by ring 81 mounted on the ram shaft to produce an electrical signal. A time band is established within which the particular material can be molded into satisfactory parts, and this band is a measure of suitable viscosity. If the melt is too viscous, a correspondingly greater time is expended in ram movement from the point at which the relief valve 70 opens to the point at which tripping of limit switch LS1 occurs. If the melt is too thin, the period of time for the ram 16 to move from the opening of relief valve 70 to the end of the injection stroke is correspondingly shorter. The clocked movent of the ram 16 occurs at constant pressure and is thereby a function of the rate of melt flow at such pressure.

Referring back to the hydraulic diagram of FIG. 1, the pressure relief valve 52 is set at 2000 p.s.i., for example. During the injection stroke, solenoid B is actuated so that the 4-way valve 54 permits the flow of fluid through line 24 into the cylinder 22 and return fluid in front of the piston 28 back to the tank 50 through check valve 60. Solenoid F is also energized so that oil in the small control line 63 is in communication with line 66. Solenoid G is deenergized at this time so that line 77 from the secondary pressure remote valve 72 is closed by valve 76 so that line 77 cannot see the tank 50 but line 73 can see the tank 50 through check valve 74. Check valve 74 is set at 65 p.s.i., for example, but has a small groove or orifice therein which permits any fluid in line 73 to bleed therethrough. Accordingly, pressure builds up in line 56 moving the piston 28 forwardly and injecting the prepared shot into the mold. Meanwhile, a portion of the oil passes through line 63, through the valve 64 into line 68, through valve 70, bleeds through the orifice in check valve 74, and thence into the sump 50 via its open path through valve 76. Since the pressure on the upstream side of check valve 74 is zero (i.e. in line 73) so long as the fluid merely drips through line 73, the pressure on the remote pressure relief valve 70 gradually builds up until it reaches the pressure value set thereon, for example 1200 p.s.i. When the pressure reaches the value set, a large volume surge of oil passes through valve 70 (arrow moves to line 73). The pressure switch PS, which was set at 50 p.s.i., now trips its electrical contacts, because the pressure on check valve 74 exceeds its set 65 p.s.i. value. Note that the remote secondary valve 72 cannot be actuated in view of the fact that its drain line 77 is closed. However, the 1200 p.s.i. control pressure on primary remote valve 70 now permits the fluid to pass through the main relief valve 52 at the same 1200 p.s.i. pressure. Therefore the pressure on line 56 is held at 1200 p.s.i. until the Hi-Lo solenoid G is actuated when the set time runs out on timer 78. At this stage, valve 76 reverses and couples line 77 to the tank 50 whereupon secondary pressure remote relief valve 72 set at 500 p.s.i., for example 70 opens. Accordingly, the main relief valve 52 passes control fluid at the same 500 p.s.i. pressure set on valve 72. Accordingly, the hydraudic pressure on the piston 28 from line 56 drops to 500 p.s.i. for the remainder of the injection stroke. When the mold is substantially filled, the forward displacement of the ram 16 trips limit switch LS1 to end the monitored time period. It is to be observed that the high volume path of oil through valve 52 does not pass to the tank 50 through heat exchange HE and filter FLT line except if the pressure in line 56 would exceed the 2000 p.s.i. pressure set thereon. This would occur only when the press is opening or closing (solenoid E shifts the valve 64 to the right to block the drain line 63 of relief valve 52) or if remote relief valve 70 or 72 were actuated.

Figure 2A:
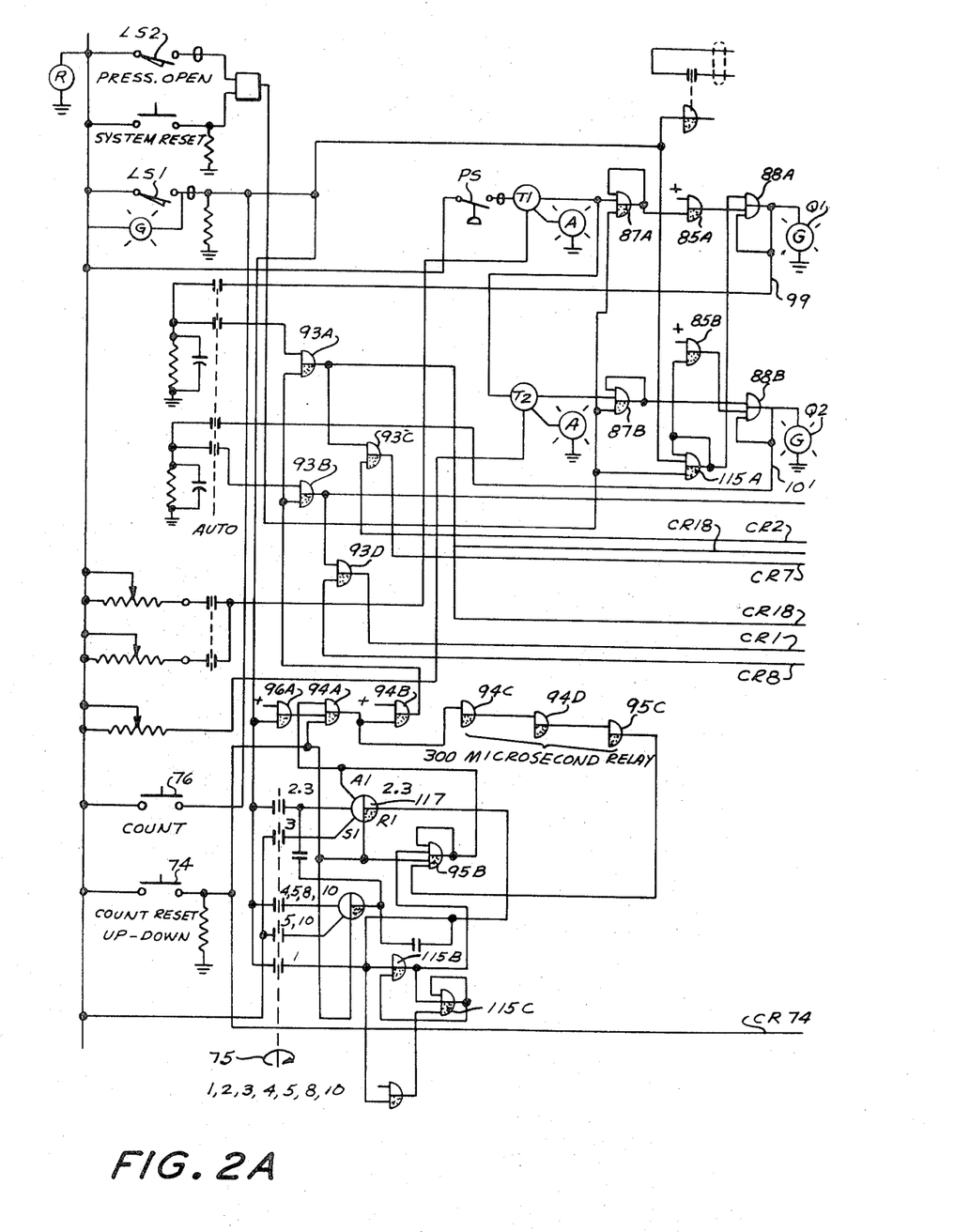

In order to establish a time band and to determine whether the ram forward speed at constant pressure is within the prescribed limits, a timing circuit is incorporated as shown in FIG. 2A. If the monitored time is too slow, a signal is transmitted to the "add count" circuit set forth in FIG. 2B whereby an increment may be added to the process control circuitry to compensate for the indicated higher viscosity. If the monitored time is faster than the prescribed band, then an electrical signal is sent to the "subtract count" circuit of FIG. 2C so that a unit of input may be subtracted from the process control circuitry to compensate for the reduced viscosity index. The process control may be corrected (1) by varying the heat input to the melt being plasticized in the barrel 12, for example, by raising or lowering the temperature of the barrel, by raising or lowering the speed of rotation of the screw 16 during plastication of the subsequent shots, or by raising or lowering the back pressure on the screw 16 during rotation, (2) by increasing or decreasing the duration of injection pressure, or (3) by increasing or decreasing the hydraulic injection pressure at which the ram moves forward at constant pressure.

Referring now to FIG. 2A, the timing circuit includes a first time T1 which is set to determine the low end of the time band and a second timer T2 which is set to determine the upper limit of the time band. Both the timers T1 and T2 are triggered by the closing of the pressure switch PS. The closing of the piston limit switch LS1 generates a signal which, depending upon whether the melt viscosity is greater, just right or lighter than the prescribed band, arrives at the measuring point respectively before T1 times out, within the range between time out of T1 and T2, or after T2 times out.

As will be apparent hereinafter, the control circuit consists of a plurality of solid state logic modules in which a plurality of electronic gates designated by the symbol "▷" are incorporated in sets of four, known as "quads." If an input signal is applied to the upper or white portion, there may be an output signal. However, if an input signal is applied to the lower or black portion, the output is zero because of the "inhibit." Thus, there is an output only if there is an input to the upper white portion and not an input to the lower black portion ('it and not" module).

Both timers T1 and T2 are millisecond timers and as incorporated in the circuit have internal contacts which close only when their respective times run out and, as shown, emit an output at such time. For example, T1 is set at 1.49 seconds after closing of pressure switch PS and T2 is set at 0.02 second thereafter. Next the position limit switch LS1 is tripped when the mold is substantially filled and the ram is almost at the end of its stroke. In effect, if LS1 closes exactly 1.50 seconds after the pressure switch PS closes (when constant injection pressure is attained), then the injection speed is deemed to be within limits and neither the "too fast" lamp Q1 nor the "too slow" lamp Q2 will light. For example, when T1 times out 1.49 seconds after it has been actuated, an electrical signal will be imposed on the upper half of quad 87A to produce a locked in output thereupon which places an inhibit on the lower half of quad 85A. Timer T2, which is also actuated by the pulse emitted by T1, begins to run and 0.02 second later imposes a signal on the upper half of squad 87B to effect a locked in output. The output signal from 87B superimposes a positive signal on the upper half of "add" gate 88B, the lower of which is already energized by quad 85B unless the latter has been inhibited by a positive output from quad 115A. Therefore, if limit switch LS1 closes exactly 1.50 seconds after the pressure switch PS closes, the pulse from limit switch LS1 places a signal on the upper half of quad 115A at such time. The output signal from 115A locks in and places an inhibit upon quad 85B. Accordingly, there will be no positive signal imposed on the lower half of "add" gate 88B at the time the signal from 87B has arrived .01 second later. Thus, since an "add" gate requires a signal on its upper and lower half, 88B does not provide an output and lamp Q2 does not light. Similarly, the output signal generated by 115A has applied a signal to the upper half of quad 88A only after the signal from 85A has been cut off (.01 second previously). Therefore, the "add" gate 88A cannot emit an output so that lamp Q1 remains until. Under these circumstances, no "add" or "subtract" correction is transmitted to the count circuit of FIG. 2A or 2B.

In the event that the limit switch LS1 were to close 1.52 seconds after the closure of the pressure switch PS, thereby indicating a more viscous melt, the signal emitted by closing LS1 would arrive at 115A and place an inhibit signal on the lower half of quad 85B too late. That is, the 1.51 second signal emitted by timer T2 would energize the upper half of 87B and correspondingly place a plus signal on the upper half of "add" gate 88B, the lower half of which already had a signal imposed thereon from 85B before the 1.52 second signal from LS1 cut 85B off. Hence, the "add" gate 88B would be locked in and transmit a correction signal along line 101 to the add count circuit.

On the other hand, should the limit switch LS1 close 1.48 seconds after the pressure switch PS were tripped, then the output of limit switch LS1 would arrive at 115A, and hence the latter's output signal would be imposed on the upper half of "add" gate 88A before the 1.49 second signal from timer T1 inhibited quad 85A. That is, the positive signal emitted by 85A, before its cutoff, would be applied to the lower half of "add" gate 88A in combination with the signal in the upper half thereof from the "too fast" pulse applied by LS1. Since 88A would be locked in as a result thereof, lamp Q1 would light and a correction signal would be transmitted to the subtract count circuit through line 99. Thus, if the viscosity of the melt stream exceeds the predetermined level, the quad 93B is energized through line 99 and the lamp Q2 is lighted. Similarly, if the viscosity falls below the predetermined level the quad 93 is energized and lamp Q1 is lighted.

The first process control cycle to be illustrated will be a heat input correction should the monitored time fall outside the prescribed limits, and the manner of heat input control will be through raising or lowering the temperature of the barrel 12 by changing the degree of heat applied by the elements 14. However, it is to be understood that correction of the heat input to the melt can just as well be accomplished in a conventional manner by varying the speed of screw rotation or by varying the degree of back pressure on the screw 16 during its rotation. When the "too slow" 101 line is energized, the temperature of the barrel 12 is raised 5° F., for example, and if the "too fast" line 99 is actuated during sample time, the temperature is lowered 5° F. However, after a temperature correction (or other mode of heat input correction) has been made, the system is allowed to reach equilibrium before another correction is made. That is, a predetermined number of injection shots are made after each temperature correction before the next time sampling is taken. If the same circuit is actuated as on the previous measurement, another 5° F. of temperature is added to (or subtracted from) the barrel, again sampling being inhibited for a predetermined number of shots thereafter to allow the system to stabilize. However, only three temperature corrections in the same direction can be made from the basic control temperature. If a fourth correction is required in the same direction an alarm signal would call the situation to the operator's attention.

Figures 2B, 3:
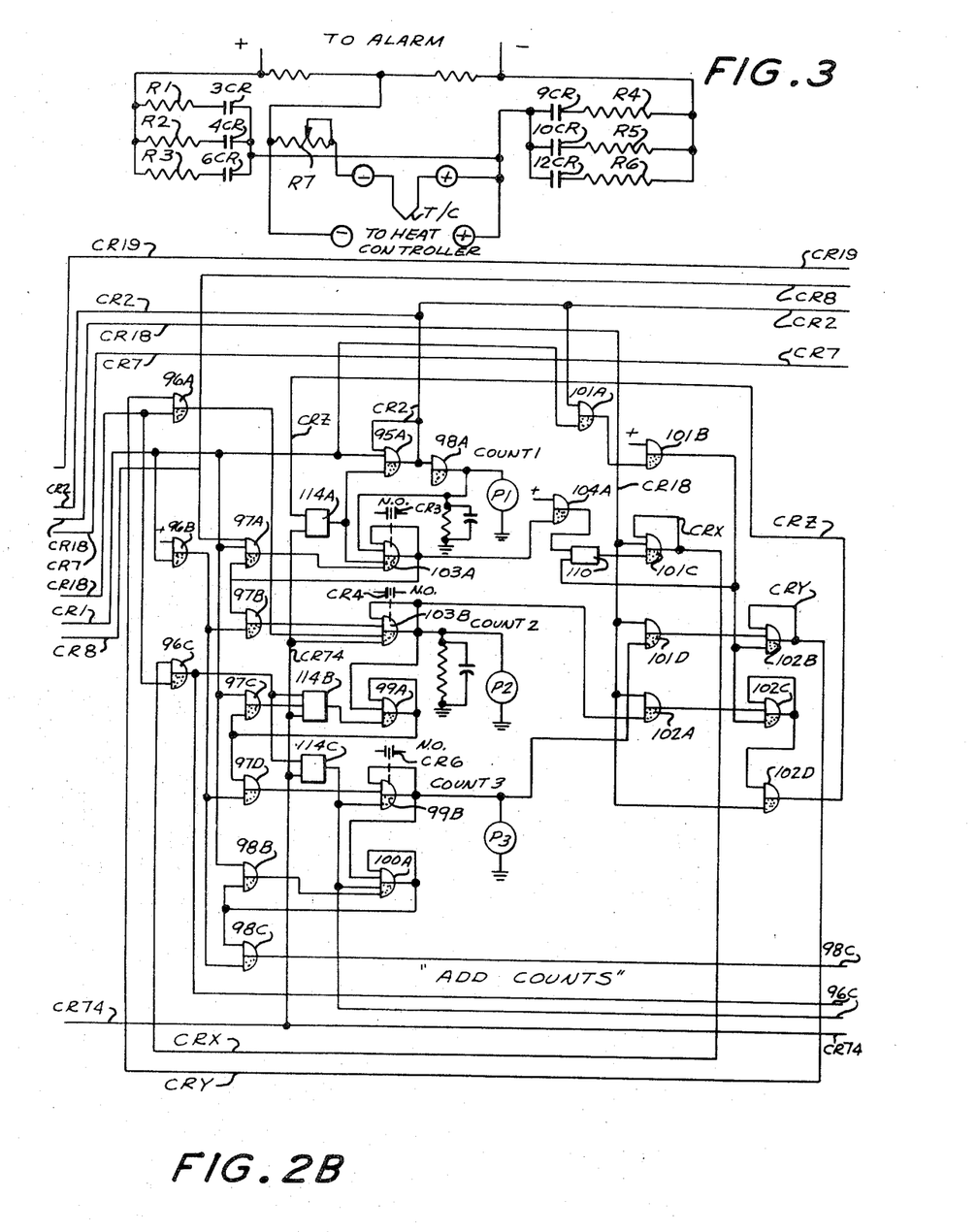

With barrel temperature set by the operator and measured by thermocouple T/C (in practice there would be separate zone control with corresponding thermocouples) the barrel heaters 14 are under the control of a suitable temperature controller. The thermocouple circuit is shown in FIG. 3 with all contacts in their normal position. For example, closure of the 3CR, 4CR or 6CR contacts creates a bucking voltage to that of thermocouple T/C wherein the temperature read is lower than that seen. Correspondingly, contacts 9CR, 10CR and 12CR add voltages to the thermocouple circuit so that temperature read is higher than that seen by the thermocouple T/C.

Referring now to FIGS. 2A and 2B, with a "too slow" signal on line 101, gate 93B is energized provided there is no inhibit signal on the bottom quadrant thereof. It is to be observed that an inhibit signal will ordinarily appear on the lower quadrant of 93B since a plus signal is always applied to the upper quadrant of gate 94B. Only an inhibit signal applied to the lower half of gate 94B discontinues the output thereof and allows 93B to pass a signal. It is the deactuation of gate 94B that allows the clocked time information to be passed to the respective "add" or "subtract" count circuits. Note that gate 94A is actuated and inhibits gate 94B provided there is a "sampling count" input to the upper quadrant of 94A and no inhibit to the lower quadrant thereof from the plus signal on 96A. In this regard, it is to be observed that 96A is deactivated by the inhibit signal on its lower half applied through line 200 by the output signal from T3 when the latter times out. Note also that a count pulse from 95B, which activates 94A, in addition applies an input to the 300 microsecond delay gates 94C, 94D and 101A. The 300 microsecond delay period is the time during which the inhibit is removed from the high viscosity "too slow" gate 93B and the low viscosity "too fast" gate 93A.

Figure 2C:
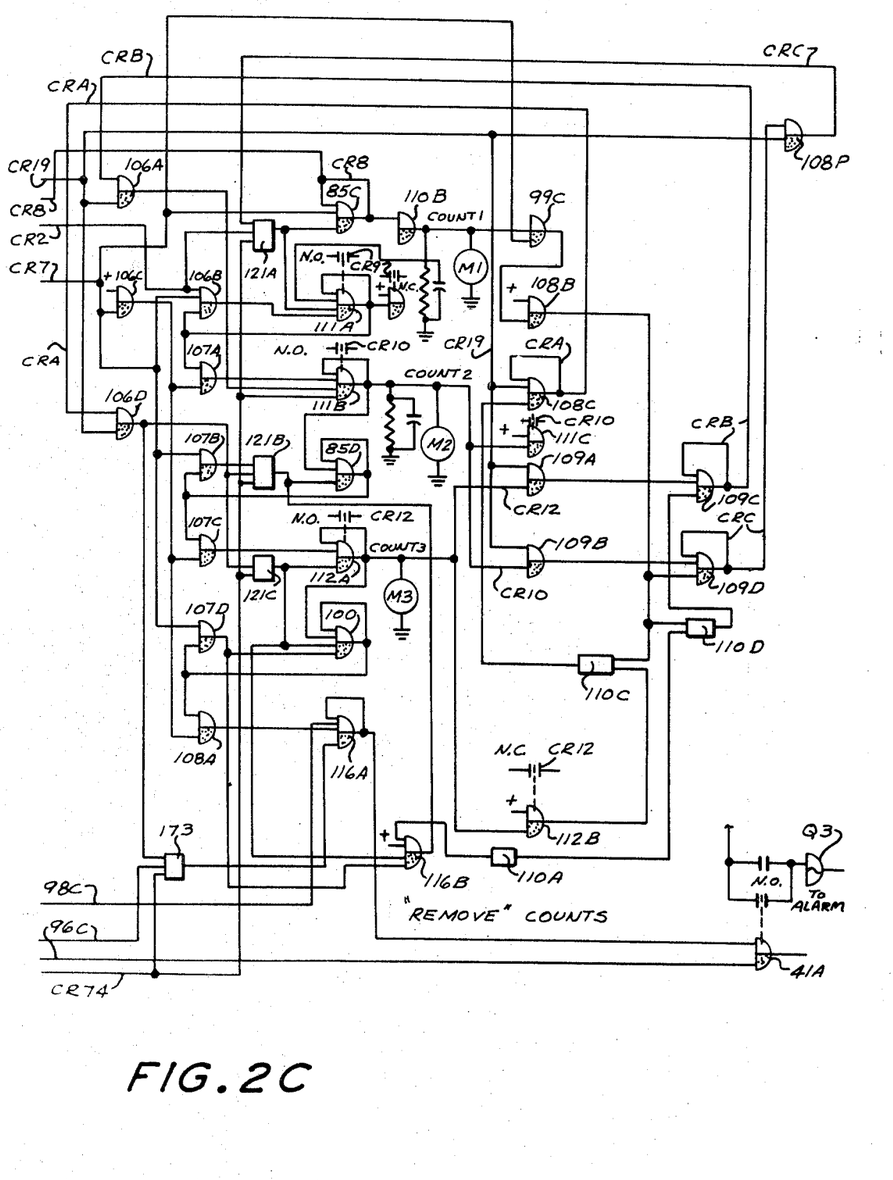

With the "too slow" signal gate 93B actuated, line CR19 now carries a signal which deenergizes all pertinent gates in the "remove heat" circuit of FIG. 2C, i.e. 106A, 106D and 108D. At the same time, gate 93D is actuated and induces an output signal on line CR1 since no inhibit signal from CR8 is imposed on the bottom of the "and not" portion of 93D (i.e. the "remove heat" gate 85C (FIG. 2C) having no signal imposed thereon allows 93D to pass an output). The output signal now appearing on line CR1 energizes the first "add heat" gate 95A provided no inhibit signal appears on the lower quadrant thereof via gate expander diode 114A from either line CRZ or from the counter reset line CR74. Since the up-down counter reset switch 74 is not depressed, no signal would appear on line CR74. Furthermore since the plus signal on gate 101B has deactivated 102C, there is no signal passing from 102D to CRZ. Accordingly, gate 95A is energized and becomes locked in this actuated position through its shunt line CR2. At this stage, the output from 95A energizes time delay gate 98A such that the first lamp P1 would light approximately 200 microseconds later. In addition, the "OR" reed gate 103A would become energized after the 200 microsecond delay period provided there were no inhibit on the "and not" bottom portion thereof at such time.

The other coupling to the inhibit gate of 103A comes from gate expander diode 114A which has two inputs. One possible signal to the expander diode 114A is derived from the CRZ line which is not actuated until a "remove heat" call is made from gate 102D. The other possible signal to the expander diode 114A may come from CR74 line so long as the counter reset 74 were not depressed. As has been indicated above, there would be no inhibit signal on the lower half of 103A from the gate 97A if the latter were actuated by a signal from CR1 or by the now deactivated CR8 line from the "remove heat" circuit. However, it is to be observed that the signal previously on CR7 which initially actuated gate 95A has now been dissipated in view of the 300 microsecond expiration of its "sample" period following the delay exercised by time delay gate 98A. Accordingly, gate 103A can now be energized by the time delayed signal from 95A which is locked in.

Actuation of gate 103A now causes it to be locked in also in addition to applying an input to the inhibit of gate 104A such that the normally open CR3 contacts thereof are caused to close. Therefore, resistance R1 is added in series with the thermocouple circuit, as shown in FIG. 3, so that the thermocouple T/C "reads" a lower temperature than the actual temperature conditions. Under such circumstances, the temperature controller asks for more heat to the barrel whereupon the barrel temperature is raised a fixed increment of from between 5° to 10° F.

It is also to be observed that the positive signal output from gate 103A does two things; places an inhibit on its own sentry gate 97A and prevents the latter from passing a subsequent signal from CR1, and places an input to gate 97B. An output would be produced by 97B at this time if there were no signal on its "inhibit." However, the positive signal on the input to gate 96B places an inhibit on 97B because the output signal from 93B has lapsed and will not repeat again until released by the sampling count. Therefore, the gate 103B cannot throw a second increment of heat into the system at the same time or immediately following the first heat increment. Hence, the next increment of heat can only be added after a predetermined number of injections have been made as controlled by the sampling switch 75 in order to allow the system to reach equilibrium. It is also to be noted that when gate 95A in the "add heat" circuit is energized it in turn inhibits 94C in FIG. 2A through CR2.

Referring now to FIG. 2A, deactivation of the "add heat" and "remove heat" circuits for a predetermined number of shots after a temperature correction has been made is accomplished by setting the sampling counter to the desired number of delay pulses, for example five. The sampling counter carries two banks of microcircuit hysteresis cores which may become actuated when the designated switch 75 contacts are closed and deliver an input to gate 95B after the number of delay pulses called for occur. For example, if switch 75 is set to delay five shots, each of the contacts with the numeral #5 is closed, and five separate closings of the end of stroke limit switch LS1 through timer T3 are required before 95B is actuated. Manual counting can also be effected by depressing push button 76 a corresponding number of times. When gate 95B emits a signal, gate 94A is actuated, no inhibit being on the latter when the timer T3 has timed out. Note that all intermediate counting pulses from the hysteresis core would have disarmed both gates 94A and 94B. When an output is emitted from 94A, the positive signal on 94B is overcome which removes the inhibit signal imposed on both the "too fast" gate 93A and the "too slow" gate 93B. The removal of these latter inhibits occurs for approximately 300 microseconds after timer T3 closes. That is, the signal emitted by 94A triggers delay gates 94C, 94D and 101A so that an inhibit is placed on the count gate 95B 300 microseconds after the count signal has passed. At this time, gate 94A becomes deenergized, and the plus signal on 94B deactivates 93A and 93B until the next proper sampling count is reached.

During the fifth sample count, if the lines 99 or 101 become energized during the 300 microsecond sampling interval, gates 93B and 93D once again transmit a signal along CR1. The signal on CR1 first of all removes the inhibit signal placed on the bottom quadrant of 97B by virtue of the positive signal now imposed on the upper gate of 96B. Now, the previously locked in signal output of gate 95A, which has locked in the gate 103A and appears on the upper quadrant of 103B causes the normally open CR4 contacts to close. Note that count 2 lamp P2 becomes lit while a second element of resistance R2 is placed in series with the thermocouple, as shown in FIG. 3.

Meanwhile, the output signal from 103B is applied to the input of 99A. However, at this time, the signal on line CR1 is applied to the "if" gate of 97C causing an inhibit signal to be placed on the "and not" gate of 99A via gate expander diode 114B. Therefore, there is no output from 99A until the signal stops on CR1 whereupon the inhibit on 99A is released. Accordingly, gate 99A is allowed to pass the locked in signal output from 95A, 103A and 103B so that 99A itself becomes locked in. Therefore, its output places an inhibit on the lower quadrant of 97C. Note that the sentry gate 97D for the third increment has an input to its upper quadrant via the output from 99A, but the previously expired inhibit signal from CR1 on gate 96B allows the plus signal from the latter to disarm gate 97D.

As before, the "too slow" gate 93B must be actuated by a signal from line 101 during the fifth sampling count thereafter before the inhibit from gate 96B is removed from gate 97D. When this occurs, the output signal locked in from 99A is allowed to pass and energize 99B. The third "add heat" lamp P3 becomes lit. Accordingly, the normally-open reed contacts CR6 close thereby adding a third increment of resistance R3 in series with the thermocouple circuit. Again, the thermocouples would now "read" less than the actual temperature by the voltage drop across the resistor R7, as shown in FIG. 3.

However, it is to be noted that the output signal from 99B although applied to the upper gate of 100A does not actuate the latter because of the signal applied to its sentry gate 98B from CR1 at that time. When the signal from CR1 expires, gate 100A can pass the signal which would then place an inhibit on the bottom of 98B thereby disarming the latter from further inhibit function on gate 100A. In the event that a fourth demand from heat is made during the next sampling period, the inhibit from the plus signal on 100A passes through gate 98C and energizes gate 116 in FIG. 2C. Energizing the gate 116A transmits a signal to reed gate 41A and causes the latter's normally open contacts to close and signal an alarm Q3 by ringing a bell and/or illuminating an alarm lamp.

In the event that a "too fast" signal is emitted from line 99 while a sampling count is permitted, a pulse will appear on the top quadrant of 93A. A signal output now appears on line CR18 and at gate 93C which becomes actuated to emit a signal on line CR7. If there have been "add heat" increments already incorporated at such time (as a result of immediately prior tripping of the "too slow" line 101), these increments are removed first. Thus, the branch of CR18 going to 101C, 101D and 102A (FIG. 2C) places an input on each of them and at the same time places an inhibit on 102D. Note that there would be no signal on line CR7 because of the inhibit of CR2 at 93D. Note that at this time, there would be no inhibit placed on gates 102B, 102C or 101C because the locked-in signal on the first "add heat" count would have deactivated the plus signal on 101B. Therefore, 101C (CRX), 102B (CRY), and 102C (CRZ) could pass signals if they were activated at their respective inputs. If there were three "add" increments of heat on, an inhibit would be placed on 101D from energized 99B, an inhibit would be placed on 102A from actuated gate 103B, but 101C would trigger to lock in line CRX. The CRX line would place a signal on 96C and actuate the latter as soon as the inhibit pulse from CR18 were dissipated. Now, the output of 96C passes through the expander 114B and places an inhibit on 99A. The previously locked in output signal from 99A is thereby cut off so as to deenergize 97D. Accordingly, 99B is deenergized, thereby deenergizing reed gate 105A and opening the CR6 contacts thereof so that the count 3 "add heat" increment is now removed. In addition, the inhibit is removed from 101D as a result of deenergizing 99B.

If there were two "add heat" increments incorporated when the "too fast" circuit was energized during sampling time, there would be no inhibit pulse placed on 101D. Accordingly, the output on 101D from CR18 would actuate 102B and lock the latter in via its CRY shunt. The locked signal on CRY would actuate 96A as soon as the CR18 pulse dissipates. The output of 96A would place an inhibit on 103B and open the previously closed contacts CR4 of 103B. Accordingly, resistances R2 as well as R3 would be removed from the thermocouple circuit. In addition, the inhibit previously placed on 102A by the output from 103B would now be removed.

If there were only a single "add heat" increment in the circuit during actuation of the "too fast" line 99, the inhibit on gate 102A would be removed and the CR18 pulse thereon would apply an input to 102C. Since there would be no inhibit on 102C at this time, an output signal would lock in 102C and place a signal on 102D. As soon as the CR18 inhibit on 102D ceases, an output would appear on line CRZ. Now, an inhibit through gate expander diode 114A would be imposed on 95A whereby the output therefrom would cease. In addition, the branch of the CRZ line from the gate expander diode 114A would place an inhibit signal on the bottom of the gate 103A so that the output therefrom would also cease. Therefore, the reed contacts of 103A and 104A would reverse and eliminate the series resistance R1 from the thermocouple circuit.

With no "add heat" increments included, the CR2 line over to the "remove heat" in FIG. 2C circuit would not carry a signal. Accordingly, gate 106B (FIG. 2C) would not be imposing an inhibit on gate 111A thereby permitting the latter gate to become actuated. Now the next signal on the CR7 line from the output of the "too fast" line 99 would apply an input signal to the first "remove heat" gate 85C. Note that at this stage, there would be no inhibit signal on gate 85C from either CR74 line nor from the CRC line or CR2 via gate expander 121A. The output pulse from 85C triggers delay gate 110B and after approximately 200 microseconds the output of 110B lights lamp M1 and applies a signal to 111A. Now there is an input to reed gate 111A which will energize that gate as soon as the inhibit signal thereon is removed. Meanwhile the gate 85C became locked in via shunt CR8, and the "too fast" signal appearing on CR7 would have also been applied to the input of gate 106B so as to place an inhibit on 111A. However, when the sampling period has expired, CR7 loses its signal and the corresponding inhibit on gate 111A so that the signal from 110B thereon energizes gate 111A to close its normally open CR9 contacts. Resistance R4 is added to the thermocouple circuit so that the temperature read by the thermocouple is greater than the actual temperature by adding voltage to the voltage output of the thermocouple T/C. In addition, gate 111A becomes locked in and applies an inhibit to its sentry gate 106B to prevent further actuation of the latter. Moreover, the output signal from 111A is applied to the input of 107A, the latter now having an inhibit pulse thereon from the plus voltage on 106C since the CR7 signal is off at this stage—when agte 85C was energized it inhibited gate 93D through CR8.

When the next "too fast" signal is received from line 99 during the sampling period, the signal on CR7 cancels the output from 106C. As soon as the inhibit pulse is lost on 107A, the voltage from 111A on the input gate of 107A passes therethrough and energizes the second "remove heat" gate 111B. Lamp M2 becomes lit and the normally open CR10 contacts 111B close. Resistance R5 is added to the thermocouple circuit at this time so that again the temperature read is greater than that seen.

The output voltage from 111B is applied to gate 85D, the output of which applies an inhibit to its sentry gate 107B only when 85D passes a signal. Note that the voltage on the CR7 lines applies an input to 107B with a consequent inhibit on 115B. When the CR7 signal ceases, the output of 85D is also applied to the top of 107C which has an inhibit applied thereto from the plus voltage on 106C. Therefore, the third "remove heat" decrement cannot be applied to 112A until the next sampling period indicates a "too fast" signal.

A third successive "remove heat" signal applied to the "too fast" line 99 would then actuate gate 112A causing its normally open CR12 contacts to close. Lamp M3 is illuminated and resistance R6 is added to the thermocouple circuit. Gate 112A is locked in and transmits a signal to gate 100 which is now inhibited from the plus signal applied by 106C to sentry gate 107D.

However, if after a predetermined number of shots (nominally five) a fourth call for "remove heat" is signaled, sentry gate 107D is released and gate 100 now no longer inhibited passes a signal to actuate quad 108A. Accordingly, 116A becomes energized to trigger alarm signal reed gate 41A to close its contacts. Again Q3 signals an alarm to call the operator's attention to the problem.

In the event that a sampling period would call for an "add heat" increment during the time that any one of the three "remove heat" counts were applied, the "remove heat" counts would be cancelled from the circuit first. For example, if all three "remove heat" counts were in the circuit, gate 108B, would carry an inhibit signal from the count 1 via gate 99C, gate 109B would carry an inhibit from the count 2 output of 111B, and gate 109A would carry an inhibit from the count 3 output of 112A. Therefore, an "add heat" signal appearing on line CR19 would actuate only gate 108C, the inhibit signal precisely thereon having been cancelled by the removal of the output of 108B when count 1 nullified its plus voltage. The signal on line CRA locks in 108C and then applies itself to 106D, the latter namely the CR19 inhibit thereon temporarily. When the "add heat" signal on line CR19 is dissipated, gate 85D becomes deenergized through gate expander 121B and gate 112A is simultaneously deenergized through expander 121C to reverse the CR12 contacts thereon and on 112B. Resistance R6 is removed from the thermocouple circuit. In addition the inhibit on gate 109A is removed.

A call for "add heat" while two "remove heat" counts are incorporated allows the signal on CR19 line to pass through gate 109A. The output on gate 109A energizes and locks in gate 109C so that an output signal appears on line CRB. When the CR19 signal has expired, the CRB pulse passes through gate 106A and applies an inhibit to 111B. Deenergizing 111B opens its CR10 contacts and the second resistance R5 in the "remove heat" thermocouple circuit is removed. Finally the inhibit on 109B imposed by the output of 111B is also removed.

When a demand for "add heat" is signaled at a time when only a single count of "remove heat" is included, the signal from CR19 actuates gate 109B and thereafter gate 109D which becomes locked in. The output from 109D is applied to 108D which transmits an output upon expiration of the CR19 signal. The pulse on line CRC is applied to the inhibit gate of 85C and to 111A via expander 121A. Thus, the 111A signal is extinguished causing its CR9 contacts to open and remove resistance R4 to the thermocouple circuit. Note also that the CR8 line no longer has a pulse thereby extinguishing lamp M1. The "add heat" circuit can now function as hereinbefore described.

It is to be observed that the foregoing illustrations all relate to the raising or lowering of the heat output to the material being plasticized depending upon whether the melt stream indicated a viscosity greater or less than the limits set up during start-up operations. Although the specification indicated that the temperature of the barrel was to be raised or lowered in fixed increments by a temperature controller via thermocouples T/C, it is apparent that the viscosity of the melt can be compensated by other means. For example, instead of the resistances R1 to R6 being operative to adjust the thermocouple readings, the same resistance circuit could be utilized to increase or decrease the speed of rotation of the screw 16 during plasticization rather than throw a greater amount or lesser amount of heat into the barrel 12 through the heating elements 14. Note that a greater speed of rotation would add heat to the system. In addition to the heat input control by way of temperature variation or screw rotation, heat input to the melt stream can also be accommodated by varying the degree of back pressure on the screw 16 during plasticization. By incorporating the resistances R1 to R6, or any pick off signal generated by the control system into the hydraulic system, to increase or decrease the degree of back pressure exerted by the ram 16 during plasticization, the same effective control of heat output to the melt can be obtained proportional to the viscosity thereof.

Referring now to FIGS. 5, 6, 7 and 8, there are shown a series of typical pressure versus time and position versus time curves for thermoplastic material. The solid line in all cases represents the characteristics exhibited by thermoplastic stock whose viscosity produces quality parts under a given set of conditions while the dotted line is indicative of higher viscosity properties exhibited by a different batch under the same general conditions.

Figure 5:
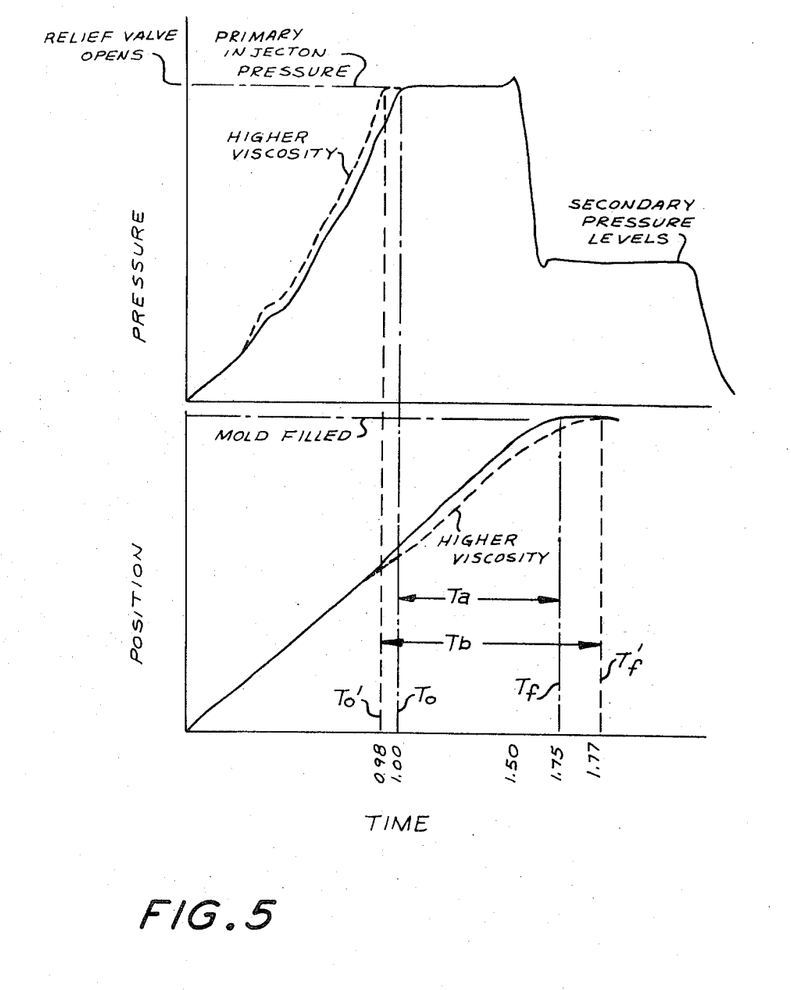
FIG. 5 is a graph demonstrating a typical pressure-position versus time curve for a representative thermoplastic material during the injection cycle, with compensation provided by appropriate adjustment in heat input to subsequent shots.
Figure 6:
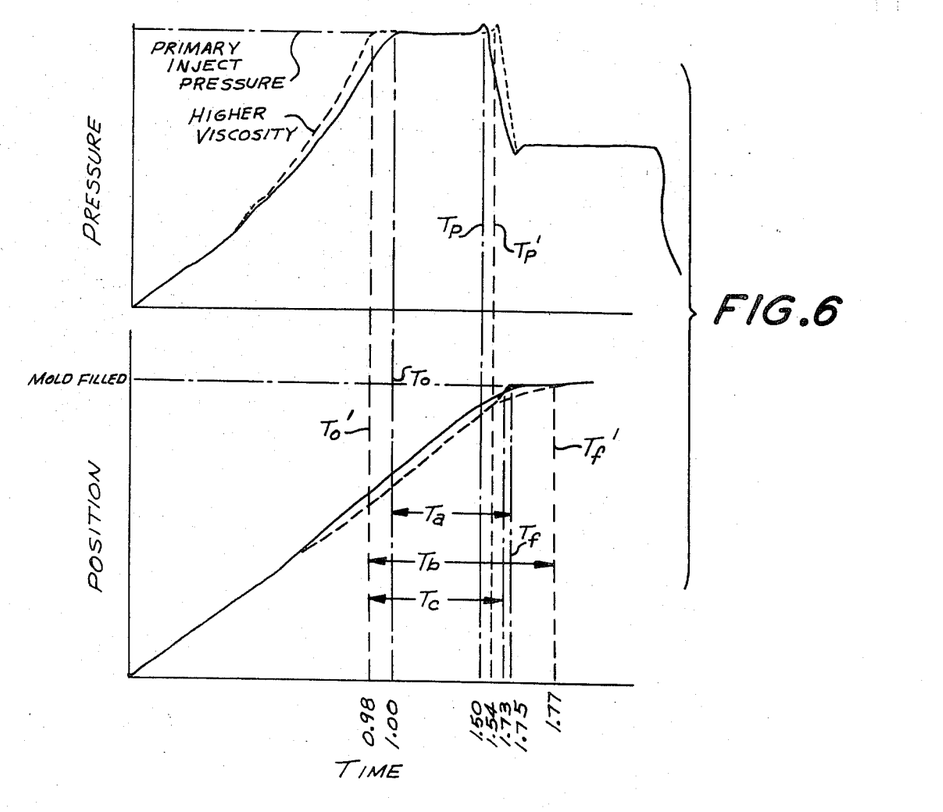
FIG. 6 is a graph demonstrating the pressure-position versus time curve with compensation provided by varying the duration of primary injection pressure.

In FIG. 5 is shown the pressure versus time curves for typical thermoplastic runs wherein the pressure is measured by a transducer incorporated in the melt stream in accordance with our prior patent application Ser. No. 18,142 filed Mar. 10, 1970. The pressure recorded in the melt stream begins at zero and moves upwardly along a primary curvilinear path until a first slight change of slope occurs in approximately 0.75 second. This first hump represents a pressure transition as the gate breaks through. Next, the pressure curve rises rapidly to a point at which the hydraulic relief valve 70 of the instant invention opens. Thereafter, the primary injection pressure becomes substantially constant during which time the rate of ram travel of the first embodiment of the present invention is monitored. That is, according to the instant invention, the time interval between the point at which the pressure relief valve 70 opens to the end of the injection stroke is measured. The position versus time curve of the first embodiment is set forth in FIG. 5 wherein deviation from prescribed limits is corrected by varying heat input. Referring to FIG. 5, at the end of a predetermined time which is set by timer 80, the primary injection pressure is cut-off and a secondary lower pressure imposed on the ram. Thus, the pressure curve drops off rapidly to a holding pressure when the solenoid G actuates valve 76 to permit secondary pressure relief valve 72 to take over. Thereafter, the pressure curve becomes relatively constant merely holding pressure to the end of the injection cycle in order to prevent shrinkage and sinks. The second embodiment of this invention is illustrated in FIG. 6 wherein the monitored time interval again is an index of viscosity but deviations from the prescribed limits set are compensated by varying the length of primary injection time from the start of the injection stroke to the point at which the secondary pressure is tripped. Finally in FIG. 8 there is shown a third embodiment of this invention wherein the pressure at which the pressure relief valve is triggered is varied in response to deviations from the prescribed time limits set.

Referring now to FIG. 5, the position versus time curve is illustrated in solid lines for a melt of satisfactory viscosity index. The point at which the pressure relief valve 70 opens to energize the pressure switch PS is represented by $T_o = 1.00$ second. The point in time at which the mold is filled for a satisfactory melt is represented by $T_f$ and is determined by the closure of the limit switch LS1. For example, if timer T1 were set to time out at 0.74 second after PS closed and timer T2 set a period 0.02 second later, $T_f$ would be normally 1.75 second and $T_f - T_o = T_a$ would be $0.75 \pm 0.01$ second. Limit switch LS1 would be set to indicate a point in time when the mold is substantially filled.

If a more viscous stock were being injected, the pressure relief switch PS would be tripped at an earlier point in time since the pressure relief valve 70 would reach its spillover point quicker for heavier stock ($T_o' = 0.98$ second). Now, the more viscous stock, as represented by the dotted line in FIG. 5, would require a longer period to complete injection at constant pressure, and the limit switch LS1 would close at $T_f' = 1.77$ seconds, for example. Therefore $T_f' - T_o'$ equals $T_b$ would be 0.79 second or 0.03 second more than the $0.75 + .01$ second band limit set. Accordingly, the "too slow" circuit would be tripped to actuate line 99 and add one increment of heat to the next successive shots being prepared and the heat input controller contacts of FIG. 3 would be operative. The correction would then reestablish the original conditions defined by the solid lines in the curves.

Referring now to FIG. 6 which combines both the pressure and position curves on a time base line, there is illustrated the manner in which variations in viscosity index as indicated by time may be compensated by changing primary injection time. The application of the increasing or decreasing of injection time offers an advantage in immediate response as compared with the time lag faced with changing the heat input of the first embodiment. As in the heat input embodiment of FIG. 5, let $T_o = 1.00$ second on the pressure versus time graph represent the point at which the pressure relief valve 70 opens and pressure switch PS closes. $T_f$ again is the point in time when the mold is substantially filled, for example, 1.75 seconds, on the position curve for a satisfactory melt. Thus, for a melt producing quality parts, $$T_a = T_f - T_o = 0.75 \pm .01$$

Assuming that a heavier viscosity shot is being injected, the pressure relief valve 70 would close earlier in time since the pressure at which the higher viscosity stock occurs sooner. See the dashed pressure-time curve. Thus, $T_o'$ might be 0.98 second, for example. Similarly, the point at which the ram would arrive home would be later in time because of increased resistance of the melt at constant pressure. As indicated, $T_f'$ might be 1.77 seconds so that $T_b = T_f' - T_o' = 0.79$ second or .03 second over tolerance. However, in this embodiment, the duration of the primary injection time is the control factor whereby increments of time are added to the clock 78 which determines how long the high pressure shall be applied.

Suppose that the timer 78 is set to run for 1.50 seconds after the injection stroke has been instituted. Thus, when the clamp 46 high pressure has been applied, the injection stroke will start and timer 78 will be tripped by closing of contacts of switch 80. In this regard, it is to be noted that it is desirable to have the high pressure applied to the ram over as long a period of the injection stroke as possible in order to shorten the injection cycle. As set up, the high pressure is applied for nominally 1.50 seconds of the total injection stroke. Since the higher viscosity stock has added 0.03 second over the band limit of $0.75 + .01$ second, the control circuit of FIG. 4 might add .04 second of time for example to the "Hi-Lo" injection timer 78. Thus, by extending the period of time during which the high pressure is applied to shot being injected, a rough compensation for the higher viscosity stock may be obtained. That is, by setting timer 78 to 1.54 seconds, the ram 16 would come to the end of its stroke sooner, i.e. at 1.73 seconds whereupon $$T_c = T_f'' - T_o' = 1.73 - 0.98 = 0.75 = T_a$$

Figure 4:
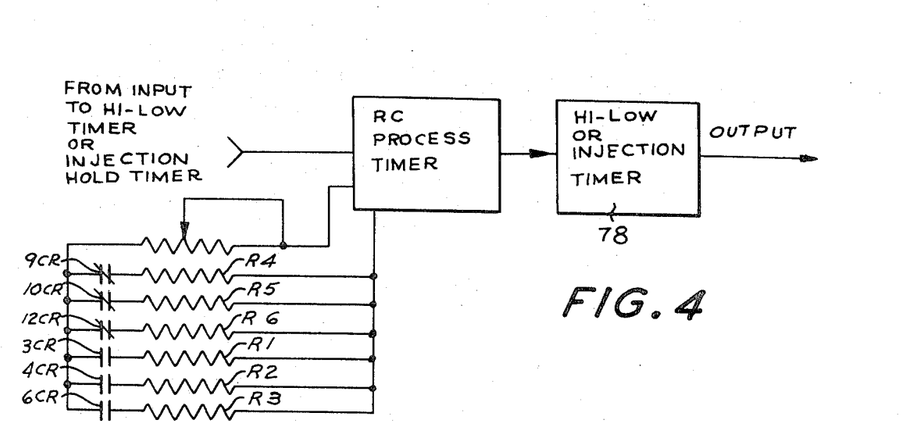
FIG. 4 is an electrical schematic diagram of the time control circuitry.

As in the "add or remove" heat circuits of FIGS. 2A, 2B and 2C in which increments of heat were added or subtracted via contacts CR3, CR4, CR6, CR9, CR10 and CR12 in the thermocouple circuit of FIG. 4, .02, .04 or .06 second increments of time are added to or subtracted from the timer 78 by means of corresponding resistances R1 to R6 in the R-C control circuit of FIG. 4. That is, by closing contacts CR4, CR5 and CR6 in the add count circuit of FIG. 2B when higher viscosity indexes are indicated by a longer $T_b$ interval, resistance is added to the solid state control circuit 150. Similarly, when a lower viscosity signal is produced on the "too fast" line 99, contacts CR9, CR10 and CR12 will be actuated via the remove count circuit of FIG. 2C, and resistance will be removed from the R-C circuit 150. Sampling period and sequence of counts all proceed in a manner previously described under the description of FIG. 2A, 2B and 2C as related to heat input control except that it is preferable to sample every shot.

Figure 7:
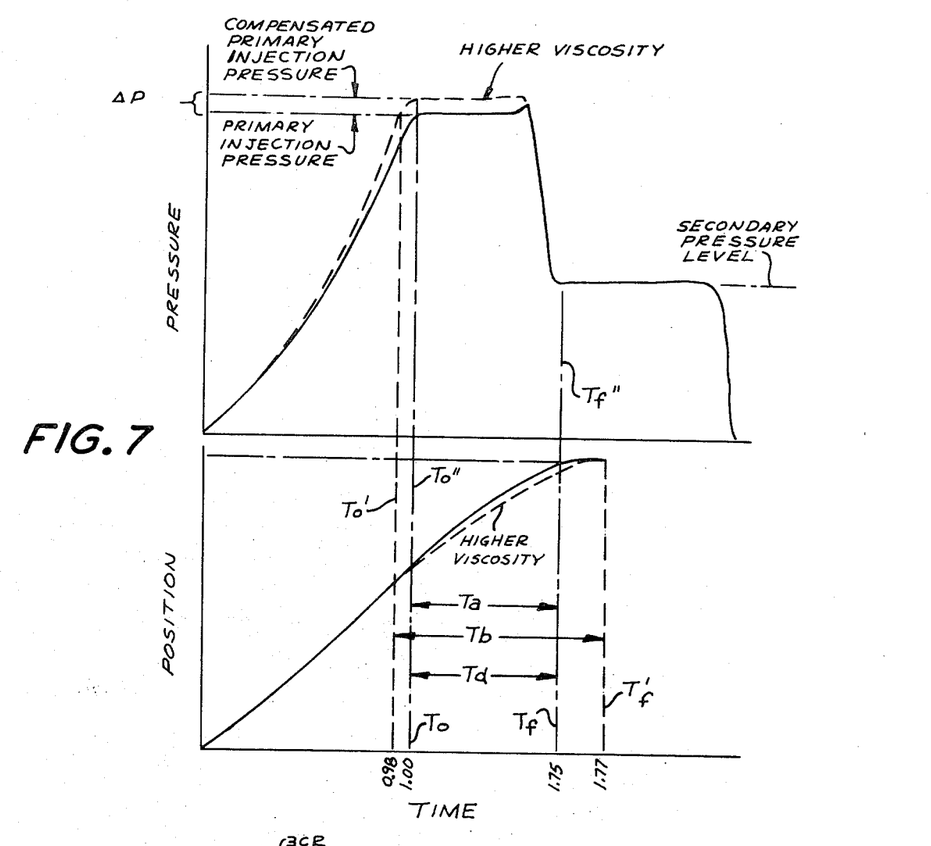
FIG. 7 is a graph illustrating a typical pressure-position versus time graph with compensation provided by varying the point at which an adjustable pressure relief valve opens for application of constant injection pressure.
Figure 8:
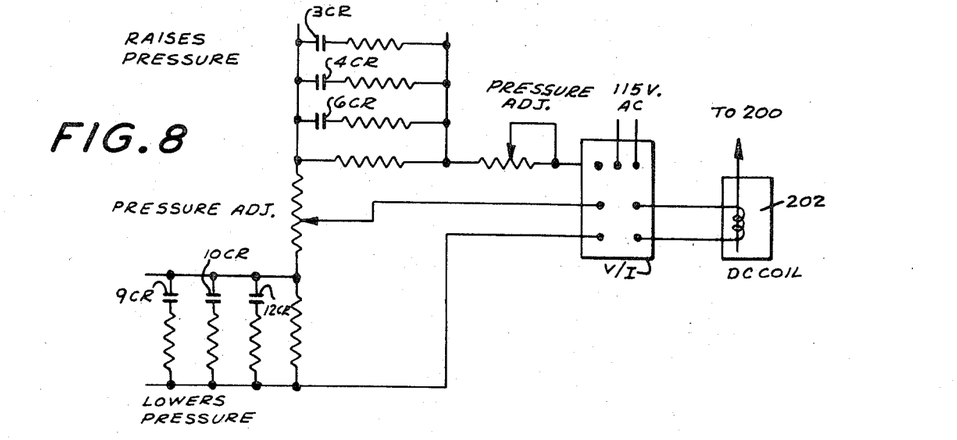
FIG. 8 is an electrical schematic diagram of the pressure control circuitry.

Referring now to FIG. 7, there is shown still another pressure-position curve in which the ordinates are superimposed on a time base abscissa. Again, the solid lines indicate the characteristics of a melt having suitable viscosity whereas the dotted lines are illustrative of a shot which deviates from the prescribed time band limit, in this case also a higher viscosity. Thus $T_o = 1.00$ second is the point at which the pressure relief valve 70 opens to actuate the pressure switch PS and is taken from the pressure versus time curve of FIG. 8. $T_f = 1.75$ seconds is the point on the position versus time graph at which the mold is substantially filled and the ram is almost home. Again, $T_a = 0.75$ second for a melt which provides quality parts.

In the event that a higher viscosity shot occurs, the pressure relief valve 70 would open at an earlier point in time, for example, $T_o' = 0.98$ as extrapolated from the pressure versus time curve. Correspondingly, because of the retarded rate of injection speed at constant pressure which has resulted from the increased viscosity, then there is an additional increment of time added to the right-hand side of the position versus time graph. That is, $T_f'$ may be 1.77 seconds whereby $$T_b = T_f' - T_o' = 1.77 - 0.98 - 0.79 \text{ seconds}$$

Since $T_a$ may be $0.75 \pm .01$ second, $T_b$ would now be .03 second above the high limit set. Accordingly, a "too slow" signal would be applied to line 101, again to actuate the "add count" circuit of FIG. 2B. However, in this third embodiment of the invention, the "add count" contacts 3CR, 4CR and 6CR (and/or the "remove count" contacts 9CR, 10CR, 12CR) are used to actuate a pressure control circuit (FIG. 8) which changes the point at which the hydraulic pressure becomes constant by varying the setting on a variable pressure relief valve 200. In this mode, the pressure relief valve 200 would be substituted in entirety for pressure relief valve 70. That is, if the first "add count" contacts CR3 close (FIG. 2B) the 3CR contacts in FIG. 8, an electrical signal will be fed from a voltage to current converter V/I to a D.C. coil 202 in the variable pressure relief valve 200 whereby the adjustable spring control therein is changed by a predetermined amount, in this case a higher pressure relief setting, for example, by 25 p.s.i. A suitable valve for this purpose is a Racine Model FEI–EAAH–506S Electro-Hydraulic Relief Valve.

Referring back to FIG. 7, an increased pressure setting on the pressure relief valve 200 increases the pressure point in the pressure-time curve at which the valve opens. Therefore, $T_o''$ will move to the right to 1.00 second, for example and becomes coincident with $T_o$. Furthermore, since a greater pressure is being applied at the constant pressure plateau, the ram 16 will close more quickly. Thus, $T_1''$ at the increased pressure will be moved to the left back to 1.75. Accordingly, $$T_d = T_f'' - T_o'' = 1.75 = 1.00 = 0.75 = T_a$$

Of course, the compensation for lesser viscosity shots is accommodated in a similar manner with successive lowering of the pressure relief valve 200 settings in predetermined increments until $T_d$ is equal to $T_a$.

It is therefore apparent that the instant invention resides in the measuring of the relative viscosity index of the plastic material in the melt stream by monitoring the time period from opening of a pressure relief valve in the hydraulic circuit to the point at which the mold is substantially filled. In the event that the monitored time of a particular shot falls outside the prescribed time limits set, compensation for the variation is automatically made in subsequent shots by (1) increasing or decreasing the heat input in predetermined increments to the next shots being prepared by appropriately changing barrel temperature speed of screw rotation, or back pressure on the screw, (2) increasing or decreasing the length of time at which the high primary injection pressure is applied during the injection stroke, or (3) raising or lowering the point on the pressure curve at which injection is performed at constant pressure by appropriately changing the pressure setting on an adjustable relief valve.

Although this invention has been described in considerable detail, such description is intended as being illustrative rather than limiting, since the invention may be variously embodied, and the scope of the invention is to be determined as claimed.

What is claimed:

1. A method for controlling injection molding of plastic components in a duplicatable manner comprising the steps of:
    (a) screw plasticizing particulate plastic material within an extrusion barrel by input of heat to said material until such material is in a molten condition defining a melt,
    (b) injecting a discrete shot of the plasticized melt from the barrel into a mold in communication therewith by advancing a hydraulic ram under the following conditions:
        (1) applying hydraulic pressure on the ram until a predetermined primary pressure level is achieved,
        (2) then maintaining substantially constant pressure on the material being injected at the primary pressure level for a predetermined period of time until the mold is substantially filled, and
        (3) thereafter applying hydraulic pressure at a secondary pressure level for the duration of the molding period,
    (c) timing a predetermined portion of the forward stroke of the ram at the primary pressure level and measuring the elapsed time interval during such portion of the stroke as an index of melt viscosity,
    (d) measuring part weight and dimensions of components being molded over a range of melt viscosities and determining the limits of the monitored time interval within which quality molded parts may be produced within a prescribed tolerance, and
    (e) when the monitored time interval falls outside prescribed limits, providing compensation for the melt viscosity deviation in the shot being monitored by adjusting at least one of the following factors in the next shot being injected
        (1) heat input to the material being plasticized,
        (2) duration of primary pressure level,
        (3) the primary pressure constant level,
    until subsequent shots are again within the prescribed time limits set.

2. The method of claim 1 wherein the degree of heat input is varied by raising the barrel temperature when the monitored time interval is of longer duration than the prescribed limits and lowering the barrel temperature when the monitored time interval is of shorter duration than the prescribed limits.

3. The method of claim 1 wherein the degree of heat input is varied by increasing the speed of screw rotation when the monitored time interval is of longer duration than the prescribed limits set and decreasing the speed of screw rotation when the monitored time interval is of shorter duration than the prescribed limits.

4. The method of claim 1 wherein the degree of heat input is varied by increasing screw back pressure when the monitored time interval is of longer duration than the prescribed limits set and decreasing the speed of screw rotation when the monitored time interval is of shorter duration than the prescribed limits.

References Cited

UNITED STATES PATENTS

| | | | |
|---|---|---|---|
| 3,354,501 | 11/1967 | Bachman | 264—40 X |
| 3,597,794 | 8/1971 | Mann | 425—145 X |
| 3,628,901 | 12/1971 | Paulson | 264—40 X |
| 3,492,700 | 2/1970 | Kornmayer | 425—145 |

ROBERT F. WHITE, Primary Examiner

R. R. KUCIA, Assistant Examiner

U.S. Cl. X.R.

264—328, 329